US009480975B2

(12) United States Patent
Xie et al.

(10) Patent No.: US 9,480,975 B2
(45) Date of Patent: Nov. 1, 2016

(54) CATALYST FOR CATALYTIC CRACKING IN A FLUIDIZED BED

(75) Inventors: Zaiku Xie, Shanghai (CN); Guangwei Ma, Shanghai (CN); Weimin Yang, Shanghai (CN); Hui Yao, Shanghai (CN); Liang Chen, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY SINOPEC, Shanghai (CN)

( * ) Notice: Subject to any disclaimer, the term of this patent is extended or adjusted under 35 U.S.C. 154(b) by 756 days.

(21) Appl. No.: 12/978,107

(22) Filed: Dec. 23, 2010

(65) Prior Publication Data

US 2011/0127193 A1   Jun. 2, 2011

Related U.S. Application Data

(63) Continuation-in-part of application No. 12/063,598, filed as application No. PCT/CN2006/002072 on Aug. 15, 2006, now abandoned.

(30) Foreign Application Priority Data

Aug. 15, 2005   (CN) .......................... 2005 1 0028794

(51) Int. Cl.
*B01J 29/80*   (2006.01)
*C10G 11/05*   (2006.01)
(Continued)

(52) U.S. Cl.
CPC ............... *B01J 29/48* (2013.01); *B01J 27/187* (2013.01); *B01J 27/188* (2013.01); *B01J 27/1853* (2013.01); *B01J 29/166* (2013.01); *B01J 29/46* (2013.01); *B01J 29/7676* (2013.01); *B01J 29/80* (2013.01); *B01J 37/0045* (2013.01); *C10G 11/18* (2013.01); *B01J 29/26* (2013.01); *B01J 29/7815* (2013.01); *B01J 2229/42* (2013.01); *B01J 2229/62* (2013.01)

(58) Field of Classification Search
USPC .............. 208/120.05, 120.15, 120.25, 120.3, 208/120.35, 124; 502/65, 73; 423/700–703, 423/709
See application file for complete search history.

(56) References Cited

U.S. PATENT DOCUMENTS 4,296,083 A * 10/1981 Rollmann ..................... 423/708
4,620,051 A    10/1986 Kolts et al.
(Continued)

FOREIGN PATENT DOCUMENTS

CN    1205306 C    1/1999
CN    1317546      10/2001
(Continued)

OTHER PUBLICATIONS

International Search Report in PCT/CN2006/002072 dated Dec. 14, 2006.

*Primary Examiner* — Michelle Stein
(74) *Attorney, Agent, or Firm* — Marshall, Gerstein & Borun LLP

(57) ABSTRACT

A catalyst for catalytic cracking in a fluidized-bed is disclosed. The catalyst comprises a support and a composition having the chemical formula (on the basis of the atom ratio): $A_aB_bP_cO_x$ for use in the industrial production of ethylene and propylene by catalytically cracking naphtha.

10 Claims, 3 Drawing Sheets

(51) Int. Cl.
  *B01J 29/48*   (2006.01)
  *B01J 27/185*  (2006.01)
  *B01J 27/187*  (2006.01)
  *B01J 27/188*  (2006.01)
  *B01J 29/16*   (2006.01)
  *B01J 29/46*   (2006.01)
  *B01J 29/76*   (2006.01)
  *B01J 37/00*   (2006.01)
  *C10G 11/18*   (2006.01)
  *B01J 29/26*   (2006.01)
  *B01J 29/78*   (2006.01)

(56) References Cited

U.S. PATENT DOCUMENTS

| | | | |
|---|---|---|---|
| 4,705,769 A | | 11/1987 | Kolts et al. |
| 4,814,532 A | * | 3/1989 | Yoshida et al. ............... 585/357 |
| 4,886,931 A | | 12/1989 | Bartek et al. |
| 5,248,643 A | * | 9/1993 | Patil et al. ...................... 502/67 |
| 6,211,104 B1 | | 4/2001 | Shi et al. |
| 6,458,737 B1 | | 10/2002 | Kishimoto et al. |

FOREIGN PATENT DOCUMENTS

| | | | |
|---|---|---|---|
| CN | 1480255 | | 3/2004 |
| CN | 1504540 | | 6/2004 |
| CN | 1504541 | * | 6/2004 |
| CN | 1542090 | | 11/2004 |
| RU | 2242279 | | 12/2004 |
| SU | 1298240 | | 3/1987 |

* cited by examiner

CATALYST FOR CATALYTIC CRACKING IN A FLUIDIZED BED

CROSS-REFERENCE TO RELATED APPLICATIONS

This application is a continuation-in-part application of U.S. Ser. No. 12/063,598, filed Sep. 9, 2008, now abandoned which is the U.S. National Phase of PCT/CN2006/002072, filed Aug. 15, 2006, which claims the benefit of Chinese patent application No. 200510028794.3, filed Aug. 15, 2005, each incorporated herein by reference.

TECHNICAL FIELD

The present invention relates to a catalyst for catalytic cracking in a fluidized-bed, especially a catalyst for catalytic cracking naphtha in a fluidized-bed to produce ethylene and propylene.

BACKGROUND ART

Currently, the primary process for producing ethylene and propylene is the steam pyrolysis, wherein the commonly used raw materials are naphtha. However, there are several shortcomings for steam pyrolysis of naphtha, e.g. high reaction temperature, harsh process conditions, high requirements on the devices, particularly on the furnace tube materials, and high-loss. Various meaningful studies thus have been carried out, in which catalytic cracking is the most attractive and promising. The object thereof is to find a suitable cracking catalyst so as to increase the selectivity to ethylene and propylene, to decrease the reaction temperature and to make the cracking catalyst have some certain flexibility to the ethylene and propylene yield.

From the current known reference documents, most catalytic cracking researchers generally use molecular sieves having a high silica to alumina ratio as catalytic materials and use high valent metallic ions for exchanging and impregnating. However, these molecular sieves have a disadvantage of bad hydrothermal stability and are difficult to regenerate.

U.S. Pat. No. 6,211,104 and CN1504540A disclosed a catalyst consisting of 10-70 wt % of clay, 5-85 wt % of inorganic oxides and 1-50 wt % of molecular sieves. When applying to raw materials conventionally used in steam pyrolysis, said catalyst exhibited excellent activity stability and high yields of light olefin, especially ethylene. Said molecular sieves were produced by impregnating 0-25 wt % of Y type zeolite having a high silica to alumina ratio or ZSM molecular sieves having MFI structure with phosphorus/alumina, magnesium or calcium, and substantially belonged to pure molecular sieve catalysts.

In addition, oxides are also used as catalysts.

U.S. Pat. No. 4,620,051 and U.S. Pat. No. 4,705,769 of PHILLIPS PETROLEUM CO (US) disclosed using an oxide catalyst having manganese oxide and iron oxide as active ingredients and adding rare earth element La and alkaline earth metal Mg, to crack $C_3$ and $C_4$ raw materials. Under the circumstance that Mn, $Mg/Al_2O_3$ catalyst was placed in a fixed-bed reactor at a temperature of 700° C. in the laboratory, water and butane were in a molar ratio of 1:1; the butane conversion rate may be up to 80%; and the selectivities to ethylene and propylene were 34% and 20% respectively. Said patents also alleged that naphtha and fluidized-bed reactors could be used therein.

CN1317546A of ENICHEM SPA (IT) disclosed a steam cracking catalyst having a chemical formula of $12CaO.7Al_2O_3$. Naphtha may be used as raw materials. The reaction was carried out at a temperature of 720-800° C. and under 1.1-1.8 atmospheric pressure, and the contact time was 0.07-0.2 s. The yield of ethylene and propylene may be up to 43%.

USSR Pat1298240.1987 disclosed placing $Zr_2O_3$ and potassium vanadate on pumice or ceramic into a medium-size apparatus. The reaction was carried under the following conditions: a temperature of 660-780° C., a space velocity of 2-5 hour$^{-1}$, a weight ratio of water/straight-run gasoline of 1:1. Normal alkane $C_{7-17}$, cyclohexane and straight-run gasoline were used as raw materials. The ethylene yield could be up to 46%, and the propylene yield could be up to 8.8%.

CN1480255A disclosed an oxide catalyst. By using naphtha as raw material for producing ethylene and propylene via catalytically cracking at a temperature of 780° C., the ethylene and propylene yield may be up to 47%.

Naphtha further contains a part of components having different molecular diameters and different cracking performances, such as aromatic hydrocarbons, cyclanes and the like. The molecular sieves shall have a better selectivity to ethylene and propylene so as to crack these complex raw materials into ethylene and propylene. In order to reduce coking and to decrease the partial pressure of the raw materials, the catalytic cracking should be generally carried out in the environment in which water vapor is present. In addition, the catalyst needs to have a better hydrothermal stability and can be regenerated repeatedly.

Since the molecular sieves such as ZSM-5 molecular sieves, Y zeolites and Mordenitee (MOR) have better shape selective catalytic performances and thermal stability, they are widely used in the petrochemical field. These molecular sieves have a homogeneous pore diameter and have different catalytic performances for the same reactants, so that the separate application thereof is disadvantageous to the processing of raw materials having complex ingredients.

The mechanical mixtures containing these two molecular sieves have multistage pore diameters, and the catalytic performances of the ingredients are different from each other. Thus, when the complex feedstocks having different molecular diameters are processed, the respective catalytic effects of said ingredients can be exerted so as to show better catalytic performances than the single ingredient. However, the mechanical mixtures merely involve the simple mixing of two molecular sieves, and their acid amount and acid strength are also the simple addition of two ingredients. Moreover, their pore diameters do not affect each other; their catalytic effects are separated from each other; the catalytic reaction is finished within each molecular sieve.

In conclusion, molecular sieves as the primary cracking catalysts are attached great importance. However, the examples regarding the co-grown molecular sieves mixing with oxides are rarely reported.

CONTENTS OF THE INVENTION

The technical problems to be solved by the present invention are high reaction temperature, low cryogenic activity of catalysts and poor selectivity in the preparation process of ethylene and propylene via catalytic cracking in the prior art, and to provide a novel catalyst for catalytic cracking in a fluidized-bed. Said catalyst is used to produce ethylene and propylene by catalytically cracking naphtha, which not only decreases the catalytic cracking temperature, but also increases the selectivity of the catalyst.

In order to solve the above-identified problems, the present invention provides the technical solution as follows: catalyst for catalytic cracking in a fluidized-bed, comprising a support and a composition having the following chemical formula, which is on the basis of atom ratio:

$$A_aB_bP_cO_x,$$

wherein A therein is at least one selected from the group consisting of rare earth elements;

B is at least one element selected from the group consisting of VIII, IB, IIB, VIIB, VIB, IA and IIA;
  a ranges from 0.01-0.5;
  b ranges from 0.01-0.5;
  c ranges from 0.01-0.5; and
  X is the total number of oxygen atoms satisfying the requirements on the valence of each of the elements in the catalyst;
  wherein the support is a composite molecular sieve or a mixture of a composite molecular sieve and at least one selected from the group consisting of SiO$_2$ and Al$_2$O$_3$, and
  said composite molecular sieve is the composite co-grown by at least two molecular sieves selected from the group consisting of ZSM-5, Y zeolite, β zeolite, MCM-22, SAPO-34 and mordenitee, wherein the molecular sieves in the catalyst are in an amount of 0-60% by weight of the catalyst.

In the technical solution above, a preferably ranges from 0.01-0.3; b preferably ranges from 0.01-0.3; c preferably ranges from 0.01-0.3. The preferred rare earth element is at least one selected from the group consisting of La and Ce; the preferred VIII group element is at least one selected from the group consisting of Fe, Co and Ni; the preferred IB is at least one selected from the group consisting of Cu and Ag; the preferred IIB is Zn; the preferred VIIB is Mn; the preferred VIB is selected from the group consisting of Cr, Mo and mixtures thereof; the preferred IA is at least one selected from the group consisting of Li, Na and K; and the preferred IIA is at least one selected from the group consisting of Ma, Ca, Ba and Sr. The preferred molecular sieve is at least one selected from the group consisting of ZSM-5, Y zeolite, mordenite and β zeolite; and the composite molecular sieve is at least one selected from the group consisting of ZSM-5/mordenite, ZSM-5/Y zeolite and ZSM-5/β zeolite. The silica to alumina molar ratio SiO$_2$/Al$_2$O$_3$ of molecular sieve and composite molecular sieves preferably ranges from 10-500, more preferably 20-300. In the catalyst, the molecular sieves are in an amount of 10-60% by weight, preferably 20-50% by weight of the catalyst.

The catalyst for catalytic cracking in fluidized-bed of the present invention is used to catalytically crack heavy oil, light diesel oil, light gasoline, catalytically cracked gasoline, gas oil, condensate oil, C4 olefin or C5 olefin.

During the preparation of the catalyst for catalytic cracking in fluidized-bed of the present invention, the elements A in the raw materials are the corresponding nitrates, oxalates or oxides; the elements B are the corresponding nitrates, oxalates, acetates or soluble halides; and the phosphorus element used therein is derived from phosphoric acid, triammonium phosphate, diammonium phosphate and ammonium dihydrogen phosphate.

In the preparation of the catalyst, active elements may be impregnated onto the molecular sieves, or be homogeneously mixed with molecular sieves for moulding. The preparation of the moulding form of the catalyst comprises heating and reflowing the slurry added with various ingredient elements and supports in a water bath at a temperature of 70-80° C. for 5 hours and spray-drying. The resulted powder is then calcined in a muffle furnace at a temperature of 600-750° C. for 3-10 hours.

BRIEF DESCRIPTION OF THE DRAWINGS

The FIG. 1 is a XRD diffraction pattern of a ZSM-5/β zeolite co-grown molecular sieve;

The FIG. 2 is a SEM photograph of a composite molecular sieve co-grown by ZSM-5/Mordenitee molecular sieve; and The FIG. 3 is a NH3-TPD spectra of a co-growth ZSM-5/MOR composite molecular sieve and a physical mixture of ZSM-5 and MOR

DETAILED DESCRIPTION

Since the porous co-grown materials are greatly different from the simple phase mechanical mixture in the surface and interface, acidity and specific surface, and have a great acid amount and a stronger acidity, the strong acid amount and weak acid amount of the co-grown molecular sieves both are notably higher than those of the mechanical mixture of the phase contained therein. This is because there appears a phase interface between ZSM-5 and MOR when a solid-state phase transition occurs. Since said ZSM-5 and MOR have different crystal cell parameters, they are not completely coherent so as to produce certain distortion energy on the phase interface. Due to the great charge density at the position of the distortion energy so as to have adsorptivity and to produce a certain acidity, the co-grown molecular sieves obtained during the crystal-transforming process have a greater acid amount than the corresponding mechanical mixture. The co-grown molecular sieves have multistage channels so as to have better catalytic performances, and can be used for processing raw material mixtures having different molecular diameters.

Figure 2:

FIG. 2 shows a SEM photograph of a composite molecular sieve co-grown by ZSM-5/Mordenitee molecular sieve. Therein the ball-like structures are ZSM-5 molecular sieve and the bar-shape structures are Mordenitee (MOR) molecular sieve. It can be seen that the two types of structures are tightly interlaced with each other and have a distinct phase interface, i.e., an interface between two phases of different type molecular sieve. This may be caused by a mosaictype growth of the microcrystallites in the composite molecular sieve.

In comparison, the particles of the different types of molecular sieves in a physical mixture would be separately dispersed. That is to say, like a pile of toy bricks with different shapes, the particles of the different types of molecular sieves can be stacked loosely and randomly, but would not be interlaced so tightly. The phase interface would be unlikely produced in a physical mixture.

Figure 3:
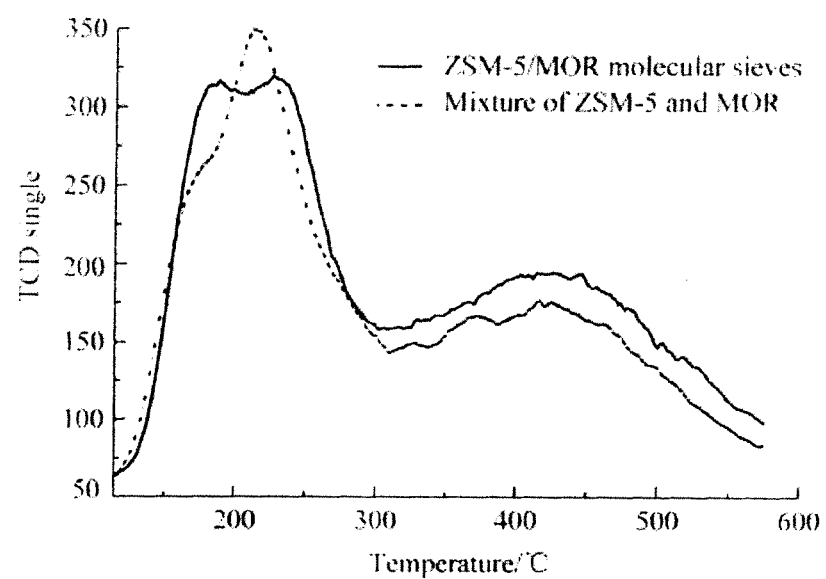

This difference can also be seen in FIG. 3, which is a NH3-TPD spectra of a co-growth ZSM-5/MOR composite molecular sieve and a physical mixture of ZSM-5 and MOR. FIG. 3 shows that the integral area of the co-grown composite is significantly larger than that of the physical mixture. This illustrates that the acid amount of the co-grown composite is larger than acid amount of the physical mixture. The increase of acid amount should be produced by the increased negative charge density at the phase interface caused by the lattice distortion, that is to say, the relative aggregation of the negative charge at the phase interface forms a Lewis acid.

Comparing with the corresponding mechanical mixtures, the co-grown molecular sieves containing such two ingredients have not only the multistage channel effect, but also stronger acidity. Moreover, since the co-grown molecular sieves are formed by partially crystal-transforming one ingredient, the channels of two ingredients of the co-grown molecular sieves communicate with each other, so as to better exert their synergistic catalytic performances.

For example, it is reported according to the inventor MA Guangwei et al, *Synthesizing Mechanism II of ZSM-5/MOR Co-grown Molecular Sieves—Phase transition during the synthesis, Journal of the Chinese Ceramic Society*, 2010, 38(10) 1937-1943, that there is the phase transition process during the synthesis of the co-grown molecular sieves. During such process, lattice distortion occurs since the crystal lattices of two phases do not match, so as to result in an increased acid amount and a strengthened acidity of the co-grown molecular sieves.

Thus the co-grown molecular sieves can be used for processing the complex ingredients having different molecular diameters and can really exert their synergistic catalytic effects since they have a multistage channel structure, a great acid amount and a widely distributed strong acid and weak acid scope.

Since at least one selected from the group of $SiO_2$, $Al_2O_3$, molecular sieves or composite molecular sieves having acidity, shape selectivity and high specific surface area is used as the cracking auxiliary agent, it is advantageous to crack olefin materials following the carbonium ion mechanism, to produce low carbon olefins, and to obtain synergistic effects when being compounded with active ingredients having oxidation reduction functions. At a relatively low temperature (580-650° C.), it achieves good catalytically cracking effects, obtains relatively high ethylene and propylene yield and good technical effects.

MODE OF CARRYING OUT THE INVENTION

In order to evaluate the activity of the catalyst of the present invention, naphtha was used as a raw material (see Table 1 for specific indexes). The reaction was carried out at a temperature of 580-650° C., a catalyst loading of 0.5-2 g naphtha/g catalyst·h, and a water/naphtha weight ratio of 0.5-3:1. The fluidized-bed reactor had an inner diameter of 39 mm and a reaction pressure of 0-0.2 MPa.

TABLE 1

Indexes of naphtha raw material

| Items | Data |
|---|---|
| Density (20° C.) kg/m3 | 704.6 |
| Distillation range, initial distillation range, ° C. | 40 |
| Final distillation range, ° C. | 60 |
| Saturated steam pressure (20° C.) kpa | 50.2 |
| Alkane % (by weight) | 65.2 |
| Normal Alkane % | 32.5 |
| Cyclane % | 28.4 |
| Olefin % (by weight) | 0.17 |
| Arene % (by weight) | 6.2 |

The present invention is further elucidated by the following examples.

Example 1

2 g of ammonium nitrate was dissolved into 100 ml of water, and 20 g of ZSM-5 molecular sieves raw powder (having a silica to alumina molar ratio $SiO_2/Al_2O_3$ of 400) was added therein. After exchanging the molecular sieve for 2 hours at 90° C., a filtration was carried out to obtain a filter cake.

16.2 g of ferric nitrate, 7.86 g of cobalt nitrate, 12.23 g of chromic nitrate and 2.4 g of lanthanum nitrate were dissolved into 250 ml of water to obtain solution A. 4.65 g of diammonium phosphate was dissolved into 100 ml of water and then added into the solution A, to obtain slurry B after homogeneous stirring.

The slurry B was heated in a water bath having a temperature of 70-80° C., and 15 g of the above-mentioned molecular sieve after exchanging and 5 g of silicon dioxide were added therein. After refluxing for 5 hours, the resulting slurry was dried and shaped by a spray-drying apparatus.

The dried powder was heated in the muffle furnace at a temperature of 740° C. and ignited for 5 hours, to obtain a catalyst after cooling. The catalyst was then passed through a sieve having 100 meshes.

The chemical formula of the obtained catalyst was

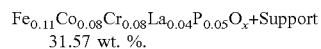

$Fe_{0.11}Co_{0.08}Cr_{0.08}La_{0.04}P_{0.05}O_x$+Support 31.57 wt. %.

The catalyst activity was evaluated under the following conditions: a fluidized-bed reactor having 39 mm inner diameter, a reaction temperature of 650° C. and a pressure of 0.15 MPa. The water/naphtha weight ratio was 3:1; the catalyst loading amount was 20 g; and the loading was 1 g of naphtha/g catalyst·hour. The gaseous product was collected to carry out a gas phase chromatoraphic analysis, wherein the product distribution and the ethylene+propylene yield were shown in Table 2.

TABLE 2

Gas phase product distribution and ethylene + propylene yield

| Products | Content (vol % for $H_2$, and wt % for the balance) |
|---|---|
| $H_2$ (vol %) | 15.5 |
| Methane | 17.08 |
| Ethane | 1.62 |
| Ethylene | 42.23 |
| Propane | 0.41 |
| Propylene | 14.72 |
| $C_4$ | 7.98 |
| the balance | 15.96 |
| Conversion rate | 76.37 |
| Ethylene yield | 32.25 |
| Propylene yield | 11.24 |
| Ethylene + propylene yield | 43.49 |

Example 2

2 g of ammonium nitrate was dissolved into 100 ml of water, and 20 g of Y molecular sieves raw powder (having a silica alumina molar ratio $SiO_2/Al_2O_3$ of 20) was added therein. After exchanging for 2 hours at 90° C., a filtration was carried out to obtain a filter cake.

7.27 g of nickel nitrate, 8.48 g of chromic nitrate and 5.44 g of cerous nitrate were dissolved into 250 ml of water to obtain the solution A. 6.54 g of diammonium phosphate was dissolved into 100 ml of water and then added into the solution A, to obtain the slurry B after homogeneous stirring.

15 g of the above-mentioned molecular sieve after exchanging, 5 g of silicon dioxide and 2 g of alumina were added into the slurry B. The remaining was the same as Example 1 to obtain a catalyst of the chemical formula:

$Ni_{0.07}Cr_{0.06}Ce_{0.09}P_{0.08}O_x$+Support 44.9 wt. %.

A catalyst evaluation was the same as Example 1. The cracked product distribution and the ethylene+propylene yield were shown in Table 3.

TABLE 3

Gas phase product distribution and ethylene + propylene yield

| Products | Content (vol % for $H_2$, and wt % for the balance) |
|---|---|
| $H_2$ (vol %) | 15.52 |
| Methane | 20.46 |
| Ethane | 2.40 |
| Ethylene | 44.00 |
| Propane | 0.37 |
| Propylene | 14.28 |
| $C_4$ | 5.60 |
| the balance | 12.89 |
| Conversion rate | 75.26 |
| Ethylene yield | 33.11 |
| Propylene yield | 10.75 |
| Ethylene + propylene yield | 43.86 |

Example 3

5.49 g of cobalt nitrate, 5.60 g of zinc nitrate, 5.44 g of cerous nitrate, 6.30 g of copper nitrate were dissolved into 250 ml of water to obtain solution A. 6.54 g of diammonium phosphate was dissolved into 100 ml of water and then added into the solution A, to obtain slurry B after homogeneous stirring.

10 g of hydrogen-type ZSM-5 molecular sieves having a silica to alumina ratio of 120, 5 g of hydrogen-type zeolite having a silica to alumina ratio of 30 and 5 g of silicon dioxide were added into the slurry B. The remaining was the same as Example 1 to obtain a catalyst of the chemical formula:

$Co_{0.06}Zn_{0.06}Cu_{0.08}Ce_{0.09}P_{0.08}O_x$+Support 40.5 wt. %.

The product yield was shown in Table 4.

Example 4

7.62 g of ferric nitrate, 5.60 g of zinc nitrate, 5.44 g of cerous nitrate, 5.18 g of calcium nitrate were dissolved into 250 ml of water to obtain solution A. 6.54 g of diammonium phosphate was dissolved into 100 ml of water and then added into the solution A, to obtain slurry B after homogeneous stirring.

5 g of hydrogen-type mordenitee having a silica to alumina ratio of 20, 5 g of hydrogen-type MCM-22 having a silica to alumina ratio of 40, 22.5 g of hydrogen-type zeolite having a silica to alumina ratio of 30 and 5 g of silicon dioxide were added to the slurry B. The remaining was the same as Example 1 to obtain a catalyst of the chemical formula:

$Fe_{0.05}Zn_{0.06}Ce_{0.09}Ca_{0.04}P_{0.08}O_x$+Support 39.7 wt. %.

The product yield was shown in Table 4.

Example 5

5.49 g of cobalt nitrate, 10.81 g of 50% manganous nitrate solution and 5.44 g of cerous nitrate were dissolved into 250 ml of water to obtain the solution A. 6.54 g of diammonium phosphate was dissolved into 100 ml of water and then added into the solution A, to obtain slurry B after homogeneous stirring.

20 g of alumina was added to the slurry B, and the remaining was the same as Example 1 to obtain a catalyst of the chemical formula:

$Mn_{0.08}Co_{0.06}Ce_{0.09}P_{0.08}O_x$+Support 46.6 wt. %.

The product yield was shown in Table 4.

Example 6

5.49 g of cobalt nitrate, 10.81 g of 50% manganous nitrate solution and 5.44 g of cerous nitrate were dissolved into 250 ml of water to obtain the solution A. 6.54 g of diammonium phosphate was dissolved into 100 ml of water and then added into the solution A, to obtain slurry B after homogeneous stirring.

20 g of silicon dioxide was added to the slurry B, and the remaining was the same as Example 1 to obtain a catalyst of the chemical formula:

$Mn_{0.08}Co_{0.06}Ce_{0.09}P_{0.08}O_x$+Support 46.6 wt. %.

The product yield was shown in Table 4.

Example 7

5.49 g of cobalt nitrate, 8.48 g of chromic nitrate, 5.44 g of cerous nitrate and 1.1 g of potassium nitrate were dissolved into 250 ml of water to obtain solution A. 6.54 g of diammonium phosphate was dissolved into 100 ml of water and then was added into the solution A, to obtain slurry B after homogeneous stirring.

15 g of silica and 5 g of alumina as the support were added to the slurry B, and the remaining was the same as Example 1 to obtain a catalyst of the chemical formula:

$Co_{0.06}Cr_{0.06}Ce_{0.09}K_{0.02}P_{0.08}O_x$+45.1 wt. % Support (containing no molecular sieves).

The product yield was shown in Table 4.

TABLE 4

Product yield of different supports

| Examples | Ethylene yield | Propylene yield | Ethylene + propylene yield |
|---|---|---|---|
| Example 3 | 36.0% | 5.47% | 41.47% |
| Example 4 | 25.37% | 15.35% | 40.72% |
| Example 5 | 30.71% | 9.33% | 40.04% |
| Example 6 | 26.98% | 12.49% | 39.47% |
| Example 7 | 27.12% | 12.33% | 39.45% |

Example 8

Slurry B was prepared according to the process in Example 1. The same ZSM-5 molecular sieves and silicon dioxide were added directly without any loading process. After homogeneous stirring, the slurry B was directly shaped by spraying. The composition of the catalyst was the same as that in Example 1. Then an evaluation was carried out according to the process of Example 1. The results were shown in Table 5.

Example 9

284 g of sodium metasilicate was dissolved into 300 g of distilled water to obtain solution A. 33.3 g of aluminium sulphate was dissolved into 100 g of distilled water obtain solution B. The solution B was slowly poured into the solution A and the resultant was strongly stirred. Then 24.4 g of ethylene diamine was added, and the pH thereof was adjusted to 11.5 with weak sulphuric acid after stirring for a period of time. The molar proportion of the sol was controlled to be Si:Al:ethylene diamine:$H_2O$=1:0.1:0.4:40. The mixed solutions were fed into an autoclave, thermally insulated at 180° C. for 40 hours, taken out, washed with water, dried and calcined to obtain composite molecular sieves of ZSM-5 and mordenitee. Said composite molecular sieves were exchanged twice at 70° C. with 5% ammonium nitrate solution and then calcined. Said process was repeated twice to obtain the hydrogen-type ZSM-5/mordenitee composite molecular sieves.

The slurry B was prepared according to the process in Example 1. ZSM-5/mordenitee composite molecular sieves having a silica to alumina ratio of 20 and silicon dioxide in the same amount were added therein, and the same process of Example 1 was used to prepare a catalyst. Then an evaluation was carried out according to the process of Example 1. The results were shown in Table 5.

Example 10

284 g of sodium metasilicate was dissolved into 300 g of distilled water to obtain solution A. 33.3 g of aluminium sulphate was added into 100 g of distilled water to obtain solution B. The solution B was slowly poured into the solution A and the resultant was strongly stirred. Then 24.4 g of ethylene diamine was added, and the pH thereof was adjusted to 11 with weak sulphuric acid after stirring for a period of time. 5 g of Y zeolite crystal seed was added therein, and the molar proportion of the sol was controlled to be Si:Al:ethylene diamine:$H_2O$=1:0.1:0.4:40. The mixed solutions were fed into an autoclave, thermally insulated at 170° C. for 36 hours, taken out, washed with water, dried and calcined to obtain composite molecular sieve of ZSM-5 and Y zeolite. Said composite molecular sieves was exchanged twice at 70° C. with 5% ammonium nitrate solution and then calcined. Said process was repeated twice to obtain the hydrogen-type ZSM-5/Y zeolite composite molecular sieve.

The slurry B was prepared according to the process in Example 1. ZSM-5/Y zeolite composite molecular sieves having a silica to alumina ratio of 20 and silicon dioxide in the same amount were added therein, and the same process of Example 1 was used to prepare a catalyst. Then an evaluation was carried out according to the process of Example 1. The results were shown in Table 5.

Example 11

284 g of sodium metasilicate was dissolved into 300 g of distilled water to obtain solution A. 33.3 g of aluminium sulphate was added into 100 g of distilled water to obtain solution B. The solution B was slowly poured into the solution A and the resultant was strongly stirred. Then 24.4 g of ethylene diamine and 10 g of tetraethyl ammonium hydroxide were added, and the pH thereof was adjusted to 12 with weak sulphuric acid after stirring for a period of time. 5 g of β zeolite crystal seeds were added, and the molar proportion of the sol was controlled to be Si:Al:ethylene diamine:$H_2O$=1:0.1:0.4:40. The mixed solutions were fed into the autoclave, thermally insulated at 160° C. for 40 hours, taken out, washed with water, dried and calcined to obtain composite molecular sieves of mordenitee and β zeolite. Said composite molecular sieve were exchanged twice at 70° C. with 5% ammonium nitrate solution and then calcined. Said process was repeated twice to obtain the hydrogen-type mordenitee/β zeolite composite molecular sieve.

The slurry B was prepared according to the process in Example 1. β zeolite/mordenitee composite molecular sieves having a silica to alumina ratio of 20 and silicon dioxide in the same amount were added therein, and the same process of Example 1 was used to prepare a catalyst. Then an evaluation was carried out according to the process of Example 1. The results were shown in Table 5.

Example 12

The slurry B was prepared according to the process in Example 1. 5 g of the hydrogen type ZSM-5 having a silica to alumina ratio of 120, 10 g of ZSM-5/mordenitee composite molecular sieves having a silica to alumina ratio of 20, 5 g of silicon dioxide were added therein, and the same process of Example 1 was used to prepare a catalyst. Then the evaluation was carried out according to the process of Example 1. The results were shown in Table 5.

Example 13

The slurry B was prepared according to the process in Example 1. 12 g of the hydrogen type ZSM-5 having a silica to alumina ratio of 150 as a support was added therein to obtain a catalyst having the composition chemical formula of $Fe_{0.11}Co_{0.08}Cr_{0.08}La_{0.04}P_{0.05}O_x$+Support 21.32 wt. %. Then an evaluation was carried out according to the process of Example 1. The results were shown in Table 5.

Example 14

Slurry B was prepared according to the process in Example 1. 20 g of the hydrogen type ZSM-5/mordenitee having a silica to alumina ratio of 30 as a support was added therein to obtain a catalyst having the composition chemical formula of $Fe_{0.11}Co_{0.08}Cr_{0.08}La_{0.04}P_{0.05}O_x$+Support 31.6 wt. %. Then an evaluation was carried out according to the process of Example 1. The results were shown in Table 5.

TABLE 5

| Examples | Ethylene yield | Propylene yield | Ethylene + propylene yield |
| --- | --- | --- | --- |
| Example 8 | 32.36% | 11.17% | 43.53% |
| Example 9 | 33.76% | 11.45% | 45.21% |
| Example 10 | 33.42% | 10.83% | 44.25% |
| Example 11 | 32.72% | 10.87% | 43.59% |
| Example 12 | 33.47% | 11.21% | 44.68% |
| Example 13 | 34.52% | 12.07% | 46.59% |
| Example 14 | 35.02% | 12.53% | 47.55% |

Example 15

Under the same conditions as those in Example 1, an evaluation was carried out by using the catalyst prepared according to Example 1 and the light diesel oil having a boiling point of lower than 350° C. as the reaction raw materials. The results were shown in Table 6.

Example 16

Under the same conditions of 550° C., a water/oil ratio of 3:1 and a space velocity of 1 as those in Example 1 an evaluation was carried out by using the catalyst prepared according to Example 1 and mixed C4 (alkane:olefin=1:1) as the reaction raw materials. The results were shown in Table 6.

TABLE 6

| Examples | Ethylene yield | Propylene yield | Ethylene + propylene yield |
|---|---|---|---|
| Example 15 | 28.47% | 9.25% | 37.72% |
| Example 16 | 12.21% | 38.63% | 50.84% |

Example 17

According to the process in Example 1, a catalyst was prepared by using the hydrogen type ZSM-5/mordenite composite molecular sieve prepared in Example 9 as the support. Said catalyst was introduced into a fixed-bed reactor having an inner diameter of 12 mm. The reaction was carried out under the conditions of a reaction temperature of 650° C., a mass space velocity of 2 hour$^{-1}$ and a water/raw oil mass ratio of 1.5. The results were shown in Table 7.

Example 18

According to the process in Example 1, a catalyst was prepared by using the hydrogen type ZSM-5/Y zeolite composite molecular sieve prepared in Example 10 as the support. An evaluation was carried out according to Example 17. The results were shown in Table 7.

Example 19

According to the process in Example 1, a catalyst was prepared by using the hydrogen type β zeolite/mordenite composite molecular sieve prepared in Example 11 as the support. An evaluation was carried out according to Example 17. The results were shown in Table 7.

Example 20

284 g of sodium metasilicate was dissolved into 300 g of distilled water to obtain solution A. 16.7 g of aluminium sulphate was added into 100 g of distilled water to obtain solution B. The solution B was slowly poured into the solution A and the resultant was strongly stirred. Then 12.2 g of ethylene diamine and 29.4 g of tetraethyl ammonium hydroxide (the mixed template agent was labeled as M) were added, and the pH thereof was adjusted to 11 with weak sulphuric acid after stirring for a period of time. The molar proportion of the sol was controlled to be Si:Al:M:H$_2$O=1:0.05:0.4:40, and 2.8 g of β zeolite crystal seeds were added. The mixed solutions were fed into the autoclave, thermally insulated at 160° C. for 40 hours, taken out, washed with water, dried and calcined to obtain co-grown molecular sieves of ZSM-5/β zeolite. Said composite molecular sieve was exchanged twice at 70° C. with 5% ammonium nitrate solution and then calcined. Said process was repeated twice to obtain the hydrogen-type ZSM-5/β zeolite co-grown molecular sieves.

According to the process in Example 1, a catalyst was prepared by using the hydrogen type ZSM-5/β zeolite co-grown molecular sieve prepared above as the support. An evaluation was carried out according to Example 17. The results were shown in Table 7.

TABLE 7

| Examples | Ethylene yield (wt. %) | Propylene yield (wt. %) | Ethylene + propylene yield (wt. %) |
|---|---|---|---|
| Example 17 | 32.01 | 30.94 | 62.95 |
| Example 18 | 28.1 | 33.35 | 61.45 |
| Example 19 | 29.06 | 32.12 | 61.18 |
| Example 20 | 31.15 | 31.08 | 62.23 |

Examples 21-22

According to the method and contents as stated in Example 9, the addition amount of sodium metaaluminate was respectively changed to 66.6 g and 16.0 g, and the molar proportion of other materials remained unchanged. The pH value of two solutions was adjusted to be 13.5 and 11 respectively, and other conditions and steps remained unchanged to prepare the ZSM-5/mordenitee composite (co-grown) molecular sieves provided in the present invention and labeled respectively as H-2 and H-3. The physical property indexes of the composite molecular sieves measured by XRD and SEM were shown in Table 8. An evaluation of the catalyst was carried out according to the method as stated in Example 12. The results were shown in Table 9.

Examples 23-24

According to the method and contents as stated in Example 9, the hydrothermal temperature was changed to 200° C., 160° C. and 120° C. respectively, and other conditions and steps remained unchanged to prepare the ZSM-5/mordenitee co-grown molecular sieves provided in the present invention and labeled respectively as H-6, H-7 and H-8. The physical property indexes of the composite molecular sieves measured by XRD and SEM were shown in Table 8. An evaluation of the catalyst was carried out according to the method as stated in Example 12. The results were shown in Table 9.

TABLE 8

Physical property indexes of ZSM-5/mordenitee composite molecular sieves

| Samples | Average crystal grain diameter (micrometer) | ZSM-5 content (wt %) | Mordenitee content (wt %) |
|---|---|---|---|
| H2 | 6 | 58.5 | 41.5 |
| H3 | 3 | 94.5 | 5.5 |
| H4 | 5 | 85.0 | 15.0 |
| H5 | 2 | 95.5 | 4.5 |
| H6 | 0.5 | 97.0 | 3.0 |

TABLE 9

Catalytic performances of ZSM-5/mordenitee composite molecular sieves

| Samples | Ethylene yield (wt %) | Propylene yield (wt %) | Total yield of ethylene and propylene (wt %) |
|---|---|---|---|
| H3 | 30.45 | 13.27 | 43.72 |
| H4 | 29.07 | 16.59 | 45.66 |
| H5 | 25.53 | 17.14 | 42.67 |

TABLE 9-continued

Catalytic performances of ZSM-5/mordenitee composite molecular sieves

| Samples | Ethylene yield (wt %) | Propylene yield (wt %) | Total yield of ethylene and propylene (wt %) |
|---|---|---|---|
| H6 | 28.24 | 16.03 | 44.27 |
| H7 | 25.76 | 16.40 | 42.16 |

Example 25

Figure 1:
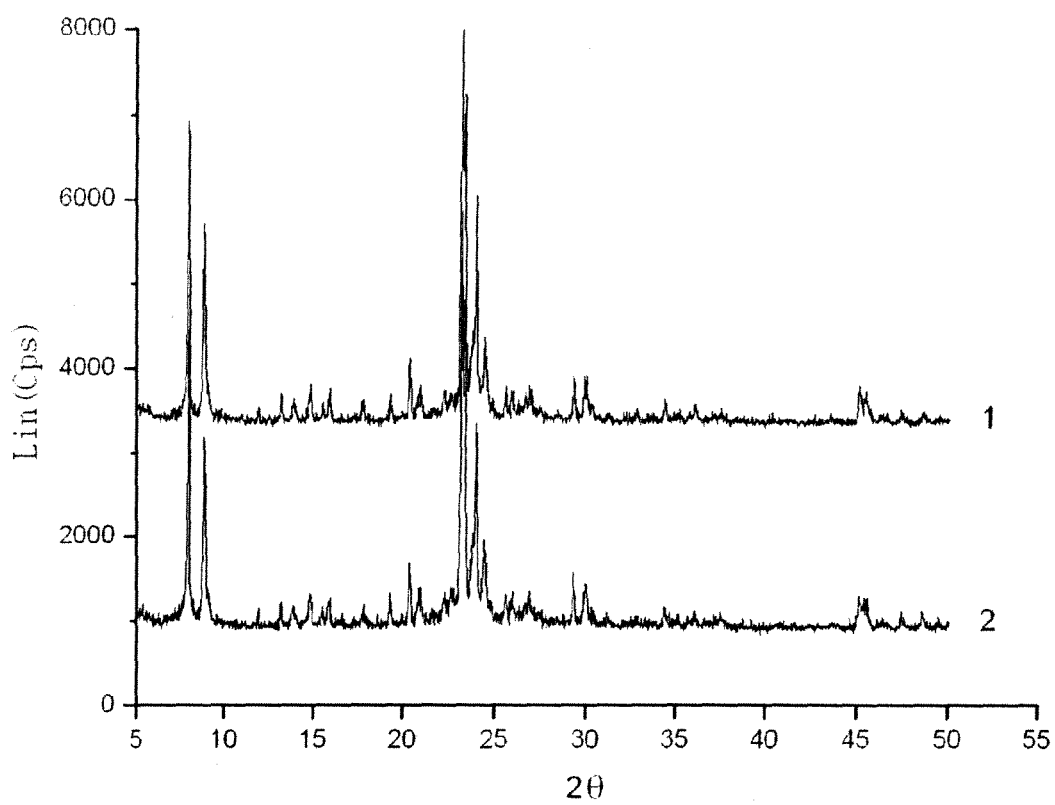

284 g of sodium metasilicate were dissolved in 300 g of distilled water to form solution A. 5.56 g of aluminium sulphate and 100 g of distilled water were used to produce solution B. The solution B was slowly dropped into the solution A, and the mixed solution was strongly stirred. 12.2 g of ethylene diamine and 29.4 g of tetraethyl ammonium hydroxide were added (the mixed template agent labeled as M). After stirring for a period of time, the pH thereof was adjusted to 11 with dilute sulfuric acid. The molar proportion of the sol was controlled to be Si:Al:M:$H_2O$=1:0.0167:0.4: 40, and 2.8 g of β zeolite crystal seed was added. The mixed solution was fed into the autoclave, thermally insulated at 160° C. for 40 h, taken out and washed with water twice, dried at 120° C. for 4 h, calcinated at 550° C. for 3 h, to produce ZSM-5/β zeolite co-grown molecular sieve. The XRD diffraction patter is shown in the Curve 1 of FIG. 1. According to the XRD diffraction quantification, it could be seen that ZSM-5 in the co-grown molecular sieve was in an amount of 94.6% by weight; and β zeolite was in an amount of 5.4% by weight. After exchanging twice at 70° C. with ammonium nitrate solution having a concentration of 5%, and calcining at 550° C. for 3 h, repeating the aforesaid operations twice, the hydrogen-type ZSM-5/β zeolite co-grown molecular sieve was produced and labeled as FH-1. The ratio of ZSM-5 and β zeolite was shown in Table 10. According to the method as stated in Example 1, the catalyst was prepared and evaluated under the conditions as stated in Example 1. The results were shown in Table 11.

Examples 26-27

According to the method as stated in Example 25, the pH value of the solution was controlled to be 10.5 and 11.5 respectively to synthesize ZSM-5/β zeolite co-grown molecular sieves labeled respectively as FH-2 and FH-3. The ratio of ZSM-5 and β zeolite was shown in Table 9. An evaluation of the catalyst was carried out according to the method as stated in Example 1. The results were shown in Table 11.

Examples 28-29

According to the method as stated in Example 25, the molar proportion of the solution was controlled to be the same, and 5.68 g and 11.3 g of β zeolite crystal seeds were respectively added therein to synthesize ZSM-5/β zeolite co-grown molecular sieves labeled respectively as FH-4 and FH-5. The ratio of ZSM-5 and 0 zeolite was measured by the XRD diffraction pattern. The results were shown in Table 10. An evaluation of the catalyst was carried out according to the method as stated in Example 1. The results were shown in Table 11.

Examples 30-31

According to the method as stated in Example 25, the molar proportion of the solution was controlled to be the same, and the crystallization temperatures were respectively set up to be 150° C. and 170° C. to synthesize ZSM-5/β zeolite co-grown molecular sieves labeled respectively as FH-6 and FH-7, wherein the ratio of ZSM-5 and β zeolite was shown in Table 10. An evaluation of the catalyst was carried out according to the method as stated in Example 1. The results were shown in Table 11.

TABLE 10

| Sample No. | ZSM-5 ratio (wt %) | β zeolite ratio (wt %) |
|---|---|---|
| FH-1 | 94.5 | 5.5 |
| FH-2 | 92.5 | 7.5 |
| FH-3 | 96.5 | 3.5 |
| FH-4 | 86.4 | 13.6 |
| FH-5 | 90.0 | 10.0 |
| FH-6 | 80.5 | 19.5 |
| FH-7 | 91.0 | 9.0 |

TABLE 11

| Sample No. | Ethylene yield (wt %) | Propylene yield (wt %) | Total yield (wt %) |
|---|---|---|---|
| FH-1 | 28.47 | 17.25 | 45.72 |
| FH-2 | 26.25 | 17.53 | 43.78 |
| FH-3 | 29.11 | 17.83 | 46.94 |
| FH-4 | 28.54 | 17.37 | 45.91 |
| FH-5 | 27.06 | 19.32 | 46.38 |
| FH-6 | 27.52 | 16.12 | 43.64 |
| FH-7 | 28.57 | 17.73 | 46.30 |

Examples 32-35

The co-grown molecular sieves synthesized according to Examples 9, 10, 11 and 25 were taken to prepare the hydrogen-type co-grown molecular sieves according to the method as stated in Example 25. The desorption curve of ammonia was determined by the Temperature Programmed Desorption (TPD) device, and the desorption temperatures at strong and weak sites were used to represent the acid strength. The desorbed ammonia passed through chromatogram, was absorbed with excessive dilute sulfuric acid, and backtitrated with a standard solution of sodium hydroxide, so as to calculate the acid amount of the molecular sieves to be measured. The results were shown in Table 5.

Comparison Example 1

The acidity of ZSM-5 molecular sieves having a silica to alumina ratio of 20 was measured according to the method as stated in Example 32. The results were shown in Table 12.

Comparison Example 2

The acidity of mordenitee molecular sieves having a silica to alumina ratio of 20 was measured according to the method as stated in Example 32. The results were shown in Table 12.

Comparison Example 3

The acidity of Y zeolite molecular sieves having a silica to alumina ratio of 10 was measured according to the method as stated in Example 32. The results were shown in Table 12.

Comparison Example 4

ZSM-5 molecular sieves having a silica to alumina ratio of 20 and mordenitee molecular sieve were used to prepare a mechanical mixture with a mass percentage content of 85% by mass of ZSM-5 and that of 15% by mass of mordenitees. The acidity thereof was measured according to the method as stated in Example 32. The results were shown in Table 12. The catalytic performance of the mechanical mixture was evaluated according to the method stated in Example 1. The results were shown in Table 13.

Comparison Example 5

ZSM-5 molecular sieves having a silica to alumina ratio of 20 and Y zeolites having a silica to alumina ratio of 10 were used to prepare the mechanical mixtures with a mass percentage content of 80% by mass of ZSM-5 and that of 20% by mass of β zeolites. The acidity thereof was measured according to the method as stated in Example 32. The results were shown in Table 12. The catalytic performance of the mechanical mixtures was evaluated according to the method stated in Example 1. The results were shown in Table 13.

Comparison Example 6

ZSM-5 molecular sieves having a silica to alumina ratio of 20 and β zeolites having a silica to alumina ratio of 20 were used to prepare the mechanical mixtures with a mass percentage content of 80.5% by mass of ZSM-5 and that of 19.5% by mass of β zeolites. The acidity thereof was measured according to the method as stated in Example 32. The results were shown in Table 12. The catalytic performance of the mechanical mixtures was evaluated according to the method stated in Example 1. The results were shown in Table 13.

Comparison Example 7

Mordenitees having a silica to alumina ratio of 20 and β zeolites having a silica to alumina ratio of 20 were used to prepare a mechanical mixture with a mass percentage content of 60.0% by mass of ZSM-5 and that of 40.0% by mass of 0 zeolites. The acidity thereof was measured according to the method as stated in Example 32. The results were shown in Table 12. The catalytic performance of the mechanical mixtures was evaluated according to the method stated in Example 1. The results were shown in Table 13.

TABLE 12

| Examples or Comp. Examples | Molecular sieve type | Desorption temperature at weak acid site (° C.) | Desorption temperature at strong acid site (° C.) | Acid amount ($\times 10^{-4}$ mole/g) |
|---|---|---|---|---|
| Example 32 | ZSM-5/MOR | 302 | 498 | 12.02 |
| Example 33 | ZSM-5/Y zeolites | 281 | 490 | 11.34 |
| Example 34 | MOR/β zeolites | 240 | 510 | 11.00 |
| Example 35 | ZSM-5/β zeolites | 250 | 450 | 9.50 |
| Comp. Ex. 1 | ZSM-5 | 245 | 420 | 5.53 |
| Comp. Ex. 2 | MOR | 250 | 510 | 8.06 |
| Comp. Ex. 3 | Y zeolites | 230 | 420 | 4.50 |
| Comp. Ex. 4 | β zeolites | 240 | 480 | 5.34 |
| Comp. Ex. 5 | ZSM-5, MOR mechanical mixtures | 260 | 490 | 6.10 |
| Comp. Ex. 6 | ZSM-5, Y zeolite mechanical mixtures | 240 | 450 | 5.40 |
| Comp. Ex. 7 | MOR, β zeolite mechanical mixtures | 250 | 460 | 7.10 |
| Comp. Ex. 8 | ZSM-5, β zeolite mechanical mixtures | 240 | 460 | 5.40 |

TABLE 13

| Examples | Phase contained therein (wt %) | Composite molecular sieve | | | Mechanical mixture | | |
|---|---|---|---|---|---|---|---|
| | | Ethylene yield (wt %) | Propylene yield (wt %) | Diolefine yield (wt %) | Ethylene yield (wt %) | Propylene yield (wt %) | Diolefine yield (wt %) |
| Comp. Ex. 1 | ZSM-5 | 35.02 | 12.53 | 47.55 | 30.2 | 12.0 | 42.2 |
| Comp. Ex. 2 | MOR | 35.5 | 13.1 | 48.6 | 29.4 | 13.2 | 42.6 |
| Comp. Ex. 3 | Y zeolites | 33.42 | 10.83 | 44.25 | 30.1 | 11.6 | 41.7 |
| Comp. Ex. 4 | β zeolites | 32.72 | 10.87 | 43.59 | 27.7 | 12.6 | 40.3 |
| Comp. Ex. 5 | ZSM-5, MOR mechanical mixtures | 31.4 | 12.6 | 44.0 | 29.8 | 11.6 | 41.4 |
| Comp. Ex. 6 | ZSM-5, Y zeolite mechanical mixtures | 32.6 | 13.0 | 45.6 | 28.6 | 12.1 | 40.7 |
| Comp. Ex. 7 | MOR, β zeolite mechanical mixtures | 31.3 | 14.2 | 45.5 | 30.2 | 10.1 | 40.3 |

TABLE 13-continued

| Examples | Phase contained therein (wt %) | Composite molecular sieve | | | Mechanical mixture | | |
|---|---|---|---|---|---|---|---|
| | | Ethylene yield (wt %) | Propylene yield (wt %) | Diolefine yield (wt %) | Ethylene yield (wt %) | Propylene yield (wt %) | Diolefine yield (wt %) |
| Comp. Ex. 8 | ZSM-5, β zeolite mechanical mixtures | 33.5 | 12.6 | 46.1 | 30.3 | 11.2 | 41.5 |

Note:
evaluation under the conditions of a reaction temperature of 650° C., a reaction pressure of 0.15 MPa, a water/feedstock mass ratio of 3:1 and a weight hourly space velocity of 1.0 h$^{-1}$.

The invention claimed is:

1. A catalyst for catalytic cracking in a fluidized-bed, comprising a support and a composition having the following chemical formula, which is on the basis of atom ratio:

$$A_aB_bP_cO_x,$$

wherein A therein is at least one selected from the group consisting of rare earth elements;
B is at least one element selected from the group consisting of VIII, IB, IIB, VIIB, VIB, IA and IIA;
a ranges from 0.01-0.5;
b ranges from 0.01-0.5;
c ranges from 0.01-0.5; and
X is the total number of oxygen atoms satisfying the requirements on the valence of each of the elements in the catalyst;
wherein the support is a composite molecular sieve or a mixture of a composite molecular sieve and at least one selected from the group consisting of SiO$_2$ and Al$_2$O$_3$, and
said composite molecular sieve is
(i) a ZSM-5/mordenite composite molecular sieve co-grown by adding ethylene diamine into a mixture obtained by pouring an aqueous solution of aluminium sulphate into an aqueous solution of sodium metasilicate;
(ii) a ZSM-5/Y zeolite composite molecular sieve co-grown by adding ethylene diamine and Y zeolite crystal seeds into a mixture obtained by pouring an aqueous solution of aluminium sulphate into an aqueous solution of sodium metasilicate;
(iii) a mordenite/β zeolite composite molecular sieve co-grown by adding (a) a mixture of ethylene diamine and tetraethyl ammonium hydroxide and (b) β zeolite crystal seeds into a mixture obtained by pouring an aqueous solution of aluminium sulphate into an aqueous solution of sodium metasilicate; or
(iv) a ZSM-5/β zeolite composite molecular sieve co-grown by adding (a) a mixture of ethylene diamine and tetraethyl ammonium hydroxide and (b) β zeolite crystal seeds into a mixture obtained by pouring an aqueous solution of aluminium sulphate into an aqueous solution of sodium metasilicate,
wherein the composite molecular sieve has at least two types of structures, and the at least two types of structures are tightly interlaced with each other and have a distinct phase interface,
wherein the composite molecular sieve in the catalyst is in an amount of from more than 0 to 60% by weight of the catalyst, and
wherein the acid amount of the co-grown composite molecular sieve is greater than the acid amount of the physical mixture selected from the group consisting of ZSM-5/mordenite, ZSM-5/Y zeolite, and ZSM-5/β zeolite, and is within a range of from 9.50×10$^{-4}$ mole/g to 12.02×10$^{-4}$ mole/g.

2. The catalyst for catalytic cracking in a fluidized-bed according to claim 1, characterized in that a ranges from 0.01-0.3; b ranges from 0.01-0.3; and c ranges from 0.01-0.3.

3. The catalyst for catalytic cracking in a fluidized-bed according to claim 1, characterized in that the rare earth element is at least one selected from the group consisting of La and Ce.

4. The catalyst for catalytic cracking in a fluidized-bed according to claim 1, characterized in that the VIII group element is at least one selected from the group consisting of Fe, Co and Ni; the IB element is at least one selected from the group consisting of Cu and Ag; the IIB element is Zn; the VIIB element is Mn; the VIB element is at least one selected from the group consisting of Cr and Mo; the IA element is at least one selected from the group consisting of Li, Na and K; and the IIA element is at least one selected from the group consisting of Mg, Ca, Ba and Sr.

5. The catalyst for catalytic cracking in a fluidized-bed according to claim 1, characterized in that the silica to alumina molar ratio SiO$_2$/Al$_2$O$_3$ of the composite molecular sieve ranges from 10 to 500.

6. The catalyst for catalytic in a cracking fluidized-bed according to claim 5, characterized in that the silica to alumina molar ratio SiO$_2$/Al$_2$O$_3$ of the composite molecular sieve ranges from 20 to 300.

7. The catalyst for catalytic cracking in a fluidized-bed according to claim 1, characterized in that the molecular sieves are in an amount of 10-60% by weight of the catalyst.

8. The catalyst for catalytic cracking in a fluidized-bed according to claim 1, characterized in that the molecular sieves are in an amount of 20-50% by weight of the catalyst.

9. A method of catalytically cracking heavy oil, light diesel oil, light gasoline, catalytically cracked gasoline, gas oil, condensate oil, C4 olefin or C5 olefin, comprising
catalytically cracking heavy oil, light diesel oil, light gasoline, catalytically cracked gasoline, gas oil, condensate oil, C4 olefin or C5 olefin in a fluidized-bed loaded with the catalyst for catalytic cracking in a fluidized-bed according to claim 1 under effective conditions.

10. A method of catalytically cracking naphtha, comprising
catalytically cracking naphtha in a fluidized-bed loaded with the catalyst for catalytic cracking in a fluidized-bed according to claim 1 under the following conditions: at a temperature of 580-650° C., a catalyst loading of 0.5-2 g naphtha/g catalyst·h, a water/naphtha weight ratio of 0.5-3:1, and a reaction pressure of 0-0.2 MPa.

* * * * *